United States Patent
Woodall et al.

(10) Patent No.: US 9,110,873 B2
(45) Date of Patent: Aug. 18, 2015

(54) PLATFORM-INDEPENDENT DATA APPLICATION DESCRIPTION LANGUAGE

(75) Inventors: Zachary P. Woodall, Sammamish, WA (US); Vijay Mital, Kirkland, WA (US); Gregory S. Lindhorst, Seattle, WA (US); Steven Miles Greenberg, Seattle, WA (US); Clinton Dee Covington, Redmond, WA (US); Pavel R. Karimov, Redmond, WA (US); Neil W. Black, Seattle, WA (US); Andrew Robert Miller, Issaquah, WA (US); Robert Scott Cooper, Woodinville, WA (US); Michael J. Eatough, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 568 days.

(21) Appl. No.: 12/147,830

(22) Filed: Jun. 27, 2008

(65) Prior Publication Data

US 2009/0327328 A1 Dec. 31, 2009

(51) Int. Cl.
- *G06F 7/00* (2006.01)
- *G06F 17/30* (2006.01)
- *G06F 17/22* (2006.01)
- *G06F 17/21* (2006.01)

(52) U.S. Cl.
CPC .......... *G06F 17/2247* (2013.01); *G06F 17/218* (2013.01)

(58) Field of Classification Search
None
See application file for complete search history.

(56) References Cited

U.S. PATENT DOCUMENTS

| | | | |
|---|---|---|---|
| 6,052,527 A | 4/2000 | Delcourt | |
| 6,775,825 B1 | 8/2004 | Grumann | |
| 6,964,034 B1 | 11/2005 | Snow | |
| 7,603,368 B2 * | 10/2009 | Super et al. | 1/1 |
| 7,774,745 B2 * | 8/2010 | Fildebrandt et al. | 717/105 |
| 2003/0060896 A9 | 3/2003 | Hulai | |
| 2005/0050555 A1 | 3/2005 | Exley | |
| 2005/0071805 A1 * | 3/2005 | Lauterbach et al. | 717/104 |
| 2005/0268277 A1 * | 12/2005 | Reeder et al. | 717/104 |
| 2006/0041582 A1 * | 2/2006 | Hekmatpour | 707/102 |
| 2006/0236307 A1 | 10/2006 | Debruin | |
| 2007/0033212 A1 | 2/2007 | Fifield | |
| 2007/0078925 A1 | 4/2007 | Neil | |
| 2007/0168932 A1 | 7/2007 | Seeger | |
| 2008/0127169 A1 * | 5/2008 | Malasky et al. | 717/174 |
| 2009/0157725 A1 * | 6/2009 | Zheng | 707/102 |
| 2009/0164497 A1 * | 6/2009 | Steinmaier et al. | 707/102 |
| 2009/0199173 A1 * | 8/2009 | Ramannavar et al. | 717/168 |
| 2010/0223325 A1 * | 9/2010 | Wendker et al. | 709/203 |

* cited by examiner

OTHER PUBLICATIONS

AS and Connector Configuration Reference, downloaded Feb. 11, 2008.
Application Definition File Reference, downloaded Feb. 11, 2008.

*Primary Examiner* — Rehana Perveen
*Assistant Examiner* — Raheem Hoffler
(74) *Attorney, Agent, or Firm* — Merchant & Gould P.C.

(57) ABSTRACT

Technologies are described herein for generating a platform-independent data application. In one method, a definition of a data schema is received for defining data types. A definition of a user interface is also received for access data stored in the data types. Further, a definition of business logic is received for enforcing validation rules and actions associated with the data types. The definitions of the data schema, the user interface, and the business logic are each received in a platform-independent format and used to generate the platform-independent data application.

20 Claims, 7 Drawing Sheets

| CONTACTS | DATABASE APPLICATION | |
|---|---|---|
| FIELD NAME | DATA TYPE | DESCRIPTION |
| ID | AUTONUMBER | |
| COMPANY | TEXT | |
| LAST NAME | TEXT | |
| FIRST NAME | TEXT | |
| E-MAIL ADDRESS | TEXT | |
| JOB TITLE | TEXT | |
| BUSINESS PHONE | TEXT | |
| HOME PHONE | TEXT | |
| MOBILE PHONE | TEXT | |
| FAX NUMBER | TEXT | |
| ADDRESS | MEMO | |
| CITY | TEXT | |
| STATE/PROVINCE | TEXT | |
| ZIP/POSTAL CODE | TEXT | |
| COUNTRY/REGION | TEXT | |
| WEB PAGE | HYPERLINK | |
| NOTES | MEMO | |
| ATTACHMENTS | ATTACHMENT | |

FIELD PROPERTIES

| GENERAL | LOOKUP | |
|---|---|---|
| FIELD SIZE | LONG INTEGER | |
| NEW VALUES | INCREMENT | |
| FORMAT | | |
| CAPTION | | |
| INDEXED | YES [NO DUPLICATES] | |
| SMART TAGS | | |
| TEXT ALIGN | GENERAL | |

A FIELD NAME CAN BE UP TO 64 CHARACTERS LONG, INCLUDING SPACES. PRESS F1 FOR THE HELP ON FIELD NAMES.

*Fig. 2*

PLATFORM-INDEPENDENT DATA APPLICATION DESCRIPTION LANGUAGE

BACKGROUND

Generally, markup languages enable users to define, among other things, the structure, visual appearance, and meaning of data. One common markup language for describing data is Extensible Markup Language ("XML"). XML is a general purpose specification that enables users to identify, exchange, and process various kinds of data. For example, XML may be used to create documents that can be utilized by a variety of application programs. Elements of an XML file may include a namespace and a schema. In XML, a namespace is commonly used to identify each class of XML document. Each XML document can use a namespace to enable processes to easily identify the type of XML associated with the document. The unique namespaces may also assist to differentiate markup elements that come from different sources and happen to have the same name.

XML schema provides a way to describe and validate data in an XML environment. A schema may describe what elements and attributes are used to describe content in an XML document, where each element is allowed, and which elements can appear within other elements. The use of schema ensures that an XML file is structured in a consistent manner. XML schema may be created by a user and is generally supported by an associated markup language, such as XML. By using an XML editor that supports schema, a user can manipulate the XML file and generate XML documents that adhere to the schema the user has created.

While XML provides these and other elements for describing data in a variety of ways, XML still has a number of significant drawbacks. For example, XML lacks functionality for defining how a system should handle data once it is received. In particular, XML cannot instruct a system to store, process, and present the data to users in a certain way. Instead, XML generally relies on each system to handle data according to the system's own configuration. Potential conflicts can occur when a group of computers collaboratively perform a complex computing process, for example. In particular, one computer may handle data in a way that is incompatible with other computers in the group. To compound the problem further, XML also lacks functionality for presenting data used by each system in a way that enables users to recognize and reconcile these potential conflicts. Moreover, XML is a generic markup language which can be used to give structure to information, but which does not innately assign any processing rules for that data.

It is with respect to these considerations and others that the disclosure made herein is presented.

SUMMARY

Technologies are described herein for enabling a portable, platform-independent data application description. In particular, through the utilization of the technologies and concepts presented herein, a novel platform-independent data application description language, which is referred to herein as the Application Extensible Markup Language ("AXL") is introduced and described. AXL is capable of defining not only data, but also how the data should be handled by a computer as well as business logic at various levels. AXL enables a user to define these concepts at a high level of abstraction, thereby enabling portions of an AXL application to be reusable without concern for technological dependencies.

In one exemplary implementation, AXL is XML based and is therefore a subset of the overall functionality provided by XML. In an AXL file, the structured information that is a part of the document may define a holistic system for tracking structured data. As opposed to being a generic means for adding structure to arbitrary information, as XML is, AXL uses XML's structural semantics to define specific attributes that in conglomeration can represent an overall data tracking system and other suitable data applications.

According to one aspect presented herein, a data structure is provided for generating a platform-independent data application, such as an AXL application. The data structure may be stored on a computer-readable storage medium and may be implemented on a computer through a suitable application program. The data structure may include a platform-independent definition of a data schema for defining data types. The data structure may further include a platform-independent definition of a user interface for accessing instances of typed data stored within the system, and a platform-independent definition of business logic for enforcing validation rules and actions associated with the data types.

According to further aspects presented herein, the platform-independent data application including the definition of the data schema, the definition of the user interface, and the definition of business logic is generated. In particular, the platform independent data application may be stored in an AXL file on the computer-readable storage medium. For example, the AXL file may be identified by an extension associated with AXL applications (e.g., ".axl"). Once the AXL file containing the data structure is created, a data tracking application or other suitable data application defined by the AXL file may be implemented by any suitable application program.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a screen display diagram showing a exemplary screen capture of a database application adapted to implement an AXL application, in accordance with one embodiment;

DETAILED DESCRIPTION

The following detailed description is directed to technologies for enabling a portable, platform-independent data application description language. Through the utilization of the technologies and concepts presented herein, a novel platform-independent data application description language, which is referred to herein as AXL, is introduced and described. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
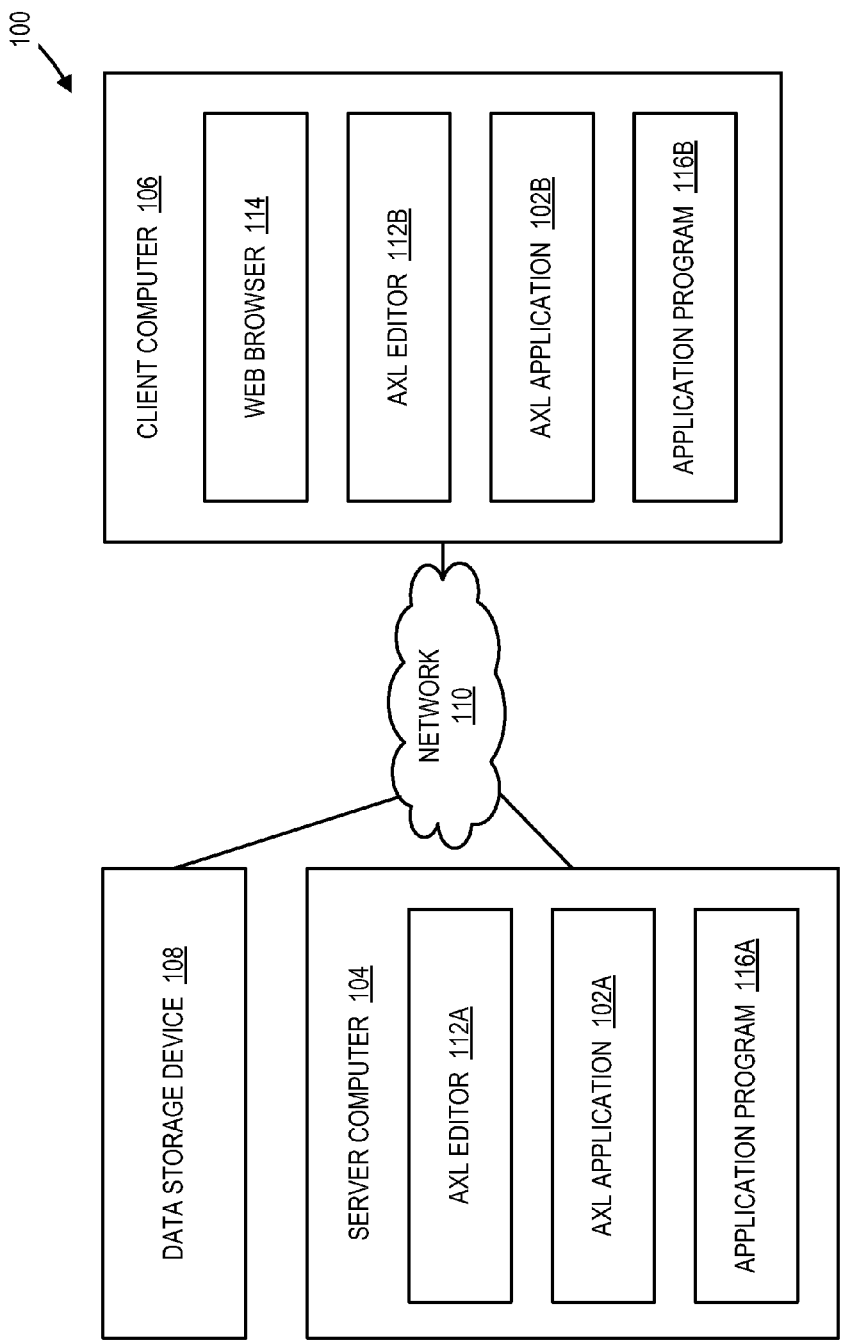
FIG. 1 is a network architecture diagram showing an AXL editor for creating an AXL application, in accordance with one embodiment.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for creating and implement AXL applications will be described. FIG. 1 shows aspects of a simplified network architecture 100 adapted to create and implement a server-side AXL application 102A and a client-side AXL application 102B (collectively referred to as AXL applications 102 or AXL application 102). The network architecture 100 includes a server computer 104, a client computer 106, and a data storage device 108, each of which is operatively coupled through a network 110. The data storage device 108 may be any suitable device for storing data. The data storage device 108 is capable of being accessed by at least the server computer 104 and the client computer 106 through the network 110. In other embodiments, the data storage device 108 may be available locally at the server computer 104 or the client computer 106.

The server-side AXL application 102A operates on a server computer 104, and the client-side AXL application 102B operates on a client computer 106. The server-side AXL application 102 may be created using a server-side AXL editor 112A. For example, the server-side AXL editor 112A may be a web application that is accessible through the network 110 by a web browser 114 operating on the client computer 106. The client-side AXL application 102B may be created using a client-side AXL editor 112B. The client-side AXL editor 112B may be an application program operating on the client computer 106. The server-side AXL editor 112A and the client-side AXL editor 112B are collectively referred to as AXL editors 112 or AXL editor 112. The AXL editors 112 provide a user-interface for creating the AXL applications 102 in accordance with the AXL data application description language.

At the server computer 104, the AXL application 102A may be implemented through a server-side application program 116A. At the client computer 106, the AXL application 102B may be implemented through a client-side application program 116B. The server-side application program 116A and the client-side application program 116B are collectively referred to as the application programs 116 or application program 116. Examples of the application programs 116 may include productivity applications, such as a word processing application, a spreadsheet application, a presentation application, and a database application. Other suitable application programs may be similarly utilized to implement the AXL applications 102. In one example, the AXL applications 102 include a contact tracking application for tracking contacts by various attributes, such as name, email address, physical address, and phone number. The contact tracking application may be utilized by a database application to create a contacts template that a user can populate with data from the data storage device 108.

An illustrative and non-limiting example of a contact tracking application written in AXL is shown below with respect to APPENDIX A. There may be numerous other ways for defining a contact tracking application as contemplated by those skilled in the art. The AXL code shown in APPENDIX A is based primarily on XML. However, it should be appreciated that AXL may be built upon any existing schema language. It should further be appreciated that the contact tracking application and other tracking applications described herein are merely illustrative examples. In particular, AXL may be used to define tracking applications as well as other suitable data applications as contemplated by those skilled in the art.

Referring now to FIG. 2, details will be described regarding an illustrative implementation of the AXL code shown above. In particular, FIG. 2 shows a screen display diagram 200 that includes a screen capture of a database application program implementing the AXL code shown above. The data fields, such as company name, home phone, and zip code, defined in the AXL code are mapped to contacts table 202.

According to embodiments, AXL provides constructs for defining, among other things, application information, data schema, forms and reports, business logic, and user interfaces. AXL provides a variety of tools that a developer can use to define data applications in a platform-independent format and at a high level of abstraction. Conceptually, AXL enables a developer to define a data application by its end result rather than how the data application achieves the end result. It should be appreciated that an AXL application may define one or more of these constructs and may integrate into or interoperate with other application types that provide additional functionality.

Unlike conventional schema languages, such as XML, AXL provides a complete and functional methodology for enabling data tracking as well as other data application functionality. In particular, AXL provides a diverse set of constructs that can work collaboratively in order to track a single instance of data in a simple yet complete cross-platform format. An example of a tracking application is the contact tracking application as previously described. AXL defines not only the form of the data that is tracked, but also how the data should be handled by multiple computers. For example, each computer in a collaborative group of computers can be configured through an AXL application to follow the same set of rules for storing the data, processing the data, and presenting the data to users. By ensuring that each computer handles the same data in the same way, any potential conflicts caused by differing and incompatible approaches for handling the data are essentially eliminated.

Referring again to FIG. 1, the AXL applications 102 may be stored in a portable file that is transportable across the network 110, for example. Since AXL applications are defined at a high level of abstraction, as opposed to being defined with platform-specific instructions, an entire AXL application or fragments of an AXL application may be reusable (e.g., copy/pasted) without concern for dependencies. In particular, in some instances, fragments of different AXL applications may be combined to form a new AXL application.

Figure 3:
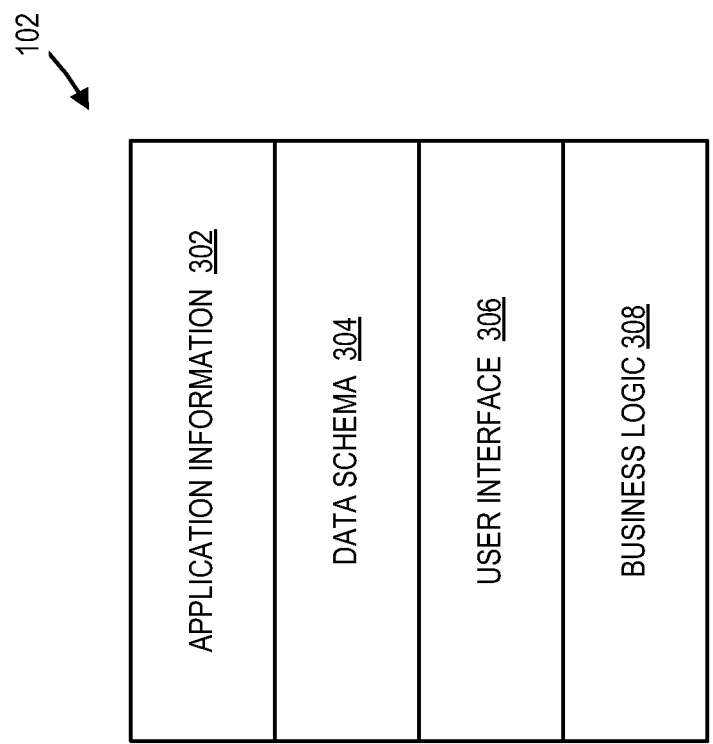
FIG. 3 is a diagram illustrating portions of an exemplary AXL application, in accordance with one embodiment.

Referring now to FIG. 3, an illustrative visual representation will be provided showing the various constructs of the AXL application 102. In particular, FIG. 3 is a diagram illustrating the AXL application 102 which includes several layers of constructs: an application information construct 302, a data schema construct 304, a user interface construct 306, and a business logic construct 308. It should be appreciated that the AXL constructs described herein are merely exemplary, and other constructs as contemplated by those skilled in the art may replace and/or supplement these constructs.

The application information construct 302 may include logic for defining any suitable descriptive information regarding the AXL application. For example, application information may include a title, a description, a date of modification, a version identifier, a name of an author, and the like. Application information is generally high-level information that is primarily provided for documenting AXL code and to aid in the organization and interpretation of the code by users. A non-limiting, exemplary implementation of the application information construct 302 is shown below.

```
<Settings> (1)
    <Description>AXL Long String</Description> (0
or 1)
    <Comment>AXL Memo String</Comment> (0 or 1)
    <Keywords> (0 or 1)
        <Keyword>AXL Short String</Keyword> (0 or
more)
    </Keywords>
    <Type URI="AXL Long String"/> (0 or 1)
</Settings>
```

The data schema construct 304 defines a structure for data in terms of various data types. As used herein, a data type refers to any suitable construct for representing a portion of a larger collection of data. In its simplest form, a data type may be a data field (i.e., a column in a database). However, it should be appreciated that a data type, as used herein, may contain richer content than conventional data fields.

In an illustrative example, a telephone may include a ringer, a receiver and headset. The telephone may also include a number of different keys. Further, the telephone may have knowledge of the particular system in which it operates. For example, a landline telephone and a mobile telephone will operate differently based on different underlying systems of communications. While a conventional field-based approach may not be optimal for describing multiple telephone systems of increased complexity, a data type, as described herein, is capable of effectively representing the various elements of different telephone systems in order to create a telephone tracking system and other suitable data applications. In particular, a single instance of a data type may include not only a single data field, but also a collection data fields. Whereas a single data field is typically limited to a simple value (e.g., text, number, etc.), a data type that includes a collection of data fields may be used to define complex systems in as detailed a manner as contemplated by the designer.

The data schema construct may include logic for defining tables and relationships, validation rules, user interface hints and feedback, predefined actions, and the like. The data schema construct may further provide logic ensuring that data in a given AXL application remains intact and consistent. In particular, AXL describes and enforces business logic, as described in the business logic construct 308, at the data level. For example, validation rules and actions are described in terms of data types, as opposed to user interface controls that render those types. This approach ensures data integrity across multiple user interfaces, including later-created user interfaces, as well as across multiple entry points, such as web services. The user interface hints are also described at the data level. For example, default conditional formatting can be described in terms of data types. The user interface construct 306, which is described in greater detail below, may choose whether or not to follow the user interface hints. A non-limiting, exemplary implementation of the data schema construct 304 is shown below.

```
<DataModel>
    <Entities> (0 or 1)
        <Entity> (0 or more)
            <Properties> (0 or 1)
                <Property> (0 or more)
            </Properties>
            <Macros> (0 or 1)
                <Macro> (0 or more)
            </Macros>
        </Entity>
    </Entities>
    <Queries> (0 or 1)
        <Query> (0 or more)
    </Queries>
    <Macros> (0 or 1)
        <Macro> (0 or more)
    </Macros>
</DataModel>
```

The user interface construct 306 defines user interfaces, such as forms and reports, enabling users to navigate between viewing and editing data. In particular, the user interface construct 306 may include logic specifying how the data is presented, the kind of data that is presented, and whether data can be edited and by whom. As used herein, a form refers to a user interface for displaying the data on a computer monitor or other display, while a report refers to a printed output (i.e., a printed document) of the data printed via a suitable printing device. In one embodiment, the forms and reports may be defined based upon existing queries, such as a standard query language ("SQL") query or an XML Path Language ("XPATH") query. These queries may be utilized to retrieve data, which can then be presented to a user via a form or a report.

Further, AXL describes and enforces business logic, as defined in the business logic construct 308, at the form level. In one example, when a user interacts with one form to request additional information, business logic at the form level may link that form to another form that contains the requested information. In another example, when data in one data type is edited through a form, business logic at the form level may dictate that data in related data types within the form should be changed or deleted accordingly. A non-limiting, exemplary implementation of the user interface construct 306 is shown below.

```
<UserInterface> (0 or 1)
    <Views> (0 or 1)
        <View> (0 or more)
            <Data> (0 or 1)
                <Query> or <Reference> (0 or 1)
                <Restriction> (0 or 1)
                <Ordering> (0 or 1)
```

```
        </Data>
        <Macros> (0 or 1)
            <Macro> (0 or more)
        </Macros>
        <Presentation> (1)
            <FormXML> (1)
        </Presentation>
        </View> (0 or more)
    </Views>
    <Macros> (0 or 1)
        <Macro> (0 or more)
    </Macros>
</UserInterface>
```

In order to further illustrate the various constructs, as described above, within the AXL data application description language, another non-limiting example will be described. In particular, a donation tracking system will be described that tracks monetary donations provided by donors. For example, the donation tracking system may be implemented through a database application that is operated by charitable organization.

The donation tracking system may be defined to include data types for active donors, inactive donors, donations, donation date, and tasks. In this case, active donors refer to donors who have recently donated (i.e., last donated after a given threshold), while inactive donors refer to donors who have not recently donated (i.e., last donated before a given threshold). The donations type may specify an amount of a donation, and the donation date type may specify the date of a donation. The tasks type may specify tasks to be fulfilled by the entity receiving the donations.

Business logic at the data level may dictate that an entry into the donation type triggers an association to the donor type for specifying the donor who made the donation and the donation date type for specifying the date of the donation. In this way, the donation management system can respond to requests based on the data, such as "show me all donations and the date of each donation for the donor named Bob." In another illustrative example, business logic at the data level may also dictate that a donation above a given amount triggers a task in the task type indicating that the donation receiver should send a thank you note to the donor.

At the form level, business logic refers to rules and associations for data presented in a form to a user. For example, business logic at the form level may dictate that if a user clicks on the name of a donor, another form may be presented displaying all of the donations associated with that donor. In this case, the business logic at the form level is used to create associations between forms. Business logic at the form level may also dictate that users of a certain class can only view or edit certain data. For example, security measures may restrict low-level employees from editing critical financial data that is limited to high-level employees.

Figure 4:
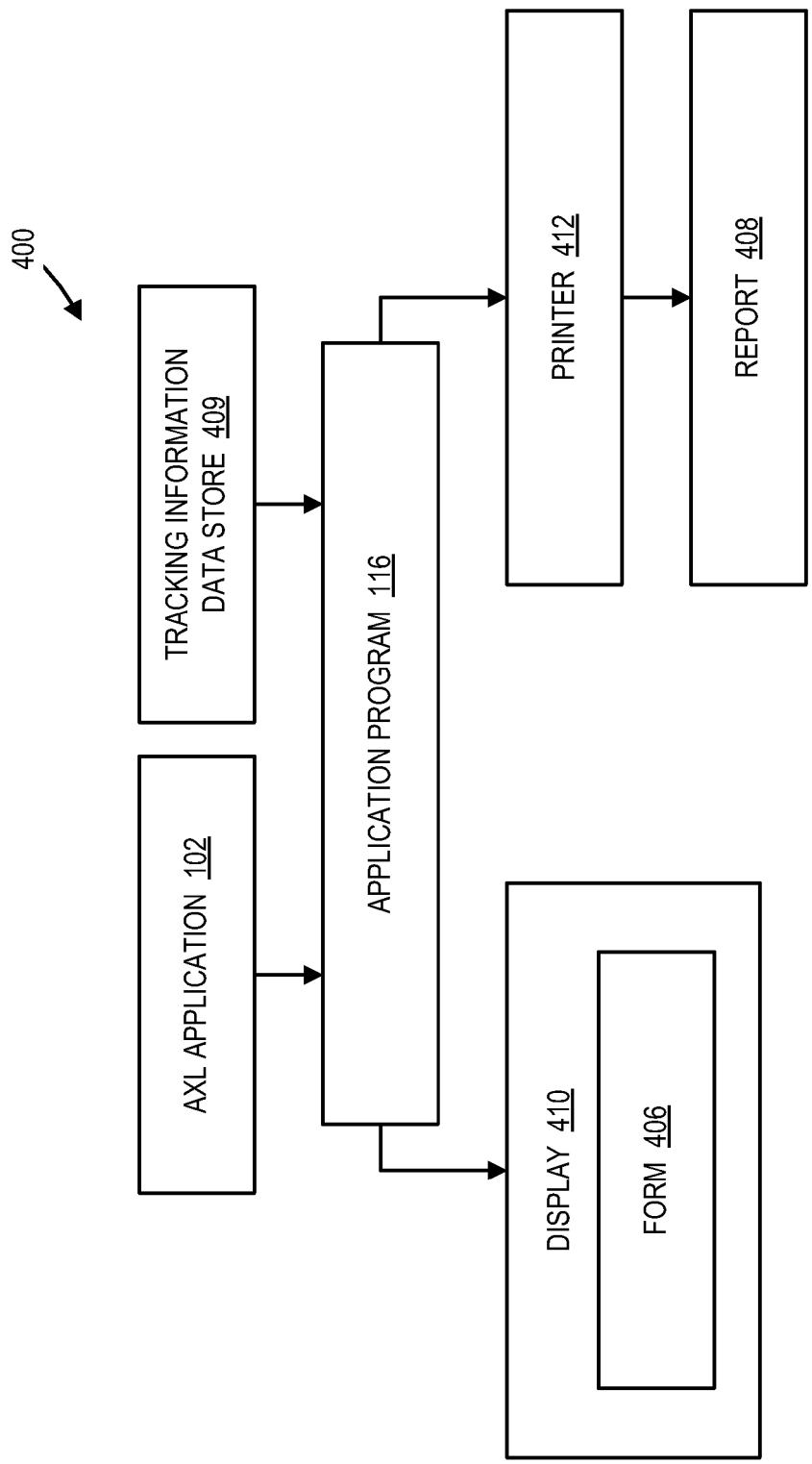
FIG. 4 is a block diagram illustrating the operation of a user interface defined by an AXL application, in accordance with one embodiment.

Referring now to FIG. 4, additional details will be provided regarding the generation of user interfaces, such as forms and reports. In particular, FIG. 4 is a block diagram 400 illustrating the AXL application 102 and the application program 116 capable of implementing the AXL application 102. In one embodiment, the AXL application 102 may provide logic enabling the presentation of data via a form 406 and a report 408. The data may be retrieved from a tracking information data store 409. The form 406 is displayed on a display 410, such as a computer monitor. In one embodiment, the computer monitor is operatively coupled to a computer and a suitable input device enabling a user to edit data via the form 406. The report 408 is a printed document printed from a printing device 412, such as a laser or inkjet printer.

Figure 5:
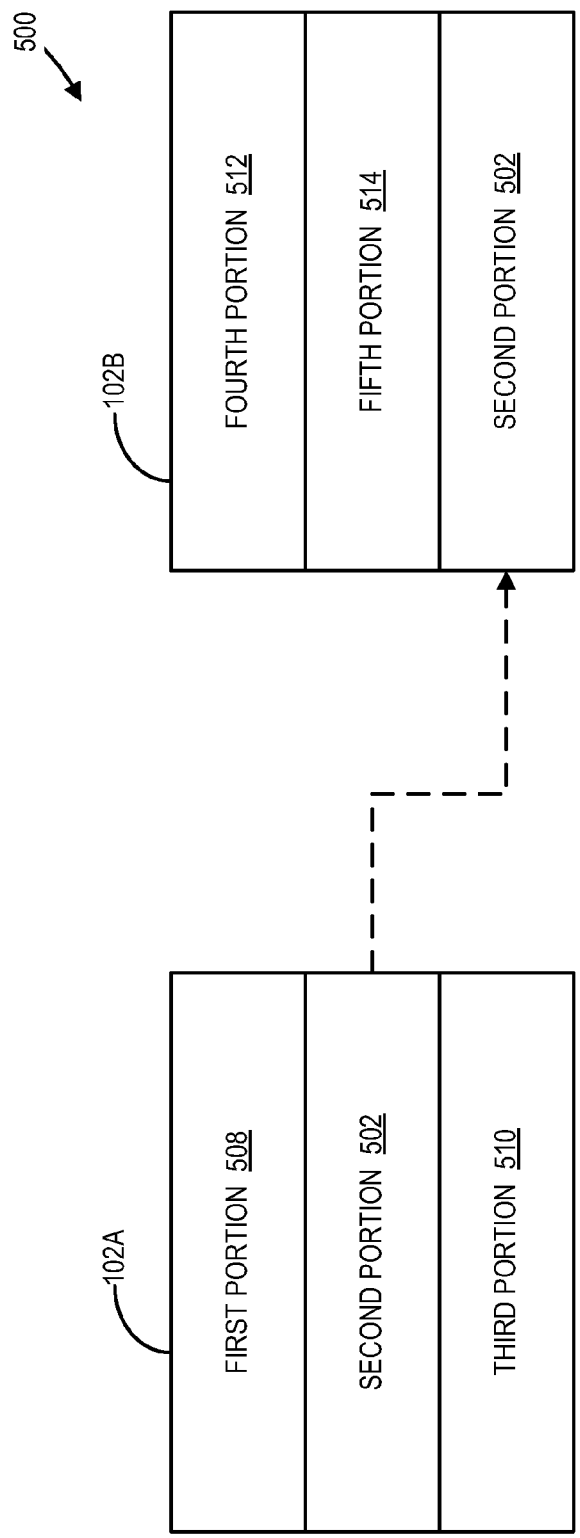
FIG. 5 is a block diagram illustrating the reusability of at least a portion of an AXL application, in accordance with one embodiment.

Referring now to FIG. 5, additional details will be provided regarding the reusability of AXL applications. In particular, FIG. 5 is a block diagram illustrating reuse of a second portion 502 between the AXL application 102A and the AXL application 102B. In particular, the AXL application 102A includes a first portion 508, the second portion 502, and a third portion 510. The AXL application 102B includes a fourth portion 512 and a fifth portion 514. The AXL application 102B further includes the second portion 502, which was copied from the AXL application 102A without concern for dependencies with respect to the first portion 508 and the third portion 510. The ability to reuse all or portions of an AXL application enables users to easily share portions of AXL applications with other users. For example, if the second portion 502 performs a useful and popular function, a user may easily share the second portion 502 without the need to share the first portion 508 and the third portion 510. Further, these portions may be provided within a template that instructs or guides a user to enter additional AXL code to supplement the portions.

Figure 6:
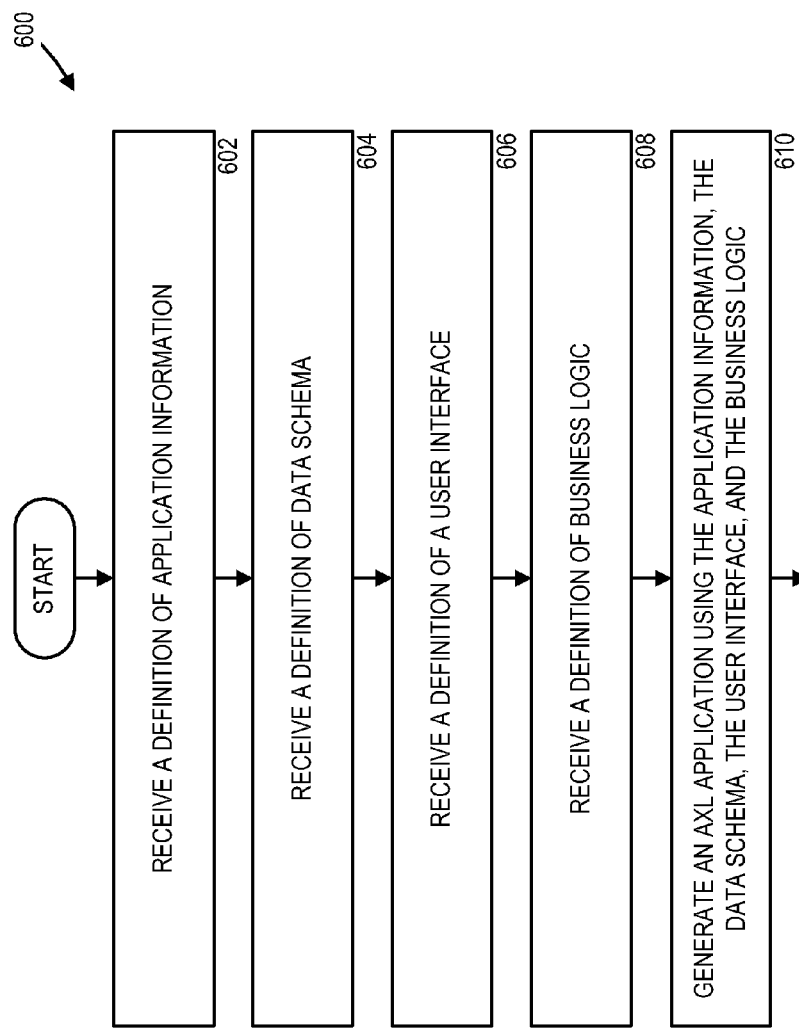
FIG. 6 is a flow diagram showing an illustrative process for generating an AXL application, in accordance with one embodiment.

Turning now to FIG. 6, additional details will be provided regarding the operation of the AXL editor 112 for creating AXL applications. In particular, FIG. 6 is a flow diagram illustrating aspects of one method provided herein for creating an AXL application. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 6, a routine 600 begins at operation 602, where the AXL editor 112 receives a definition of application information in accordance with the AXL data application description language. The application information may include meta-information about the AXL application being created. The meta-information may include, for example, a description of the AXL application and keywords associated with the AXL application. The routine 600 proceeds to operation 604.

At operation 604, the AXL editor 112 receives a definition of a data schema in accordance with the AXL data application description language. The data schema may define, among other things, data types, properties of the data types, relationships between data types, and queries for retrieving data. The routine 600 proceeds to operation 606 where the AXL editor 112 receives a definition of a user interface, such as a forms and reports. The user interface may be defined to display data in a certain way or to display only a limited subset of data. The user interface may also be defined to restrict access to data and to enable users edit the data. The routine 600 proceeds to operation 608.

At operation 608, the AXL editor 112 receives a definition of business logic in accordance with the AXL data application description language. The business logic may be utilized to enforce rules for the way data is handled at the data level as well as the form level. By enforcing these rules, the business logic also maintains data integrity across the data handled by the AXL application. The routine 600 proceeds to operation 610 where the AXL editor 112 generates an AXL application using, among other things, definitions for the application information, the data schema, the user interface, and the business logic. The AXL application may be stored in a portable file that can be shared between users and across computer networks. The AXL application may also be provided with a dedicated file extension (e.g., ".axl"), which enables users and computers to easily identify AXL-based files.

Figure 7:
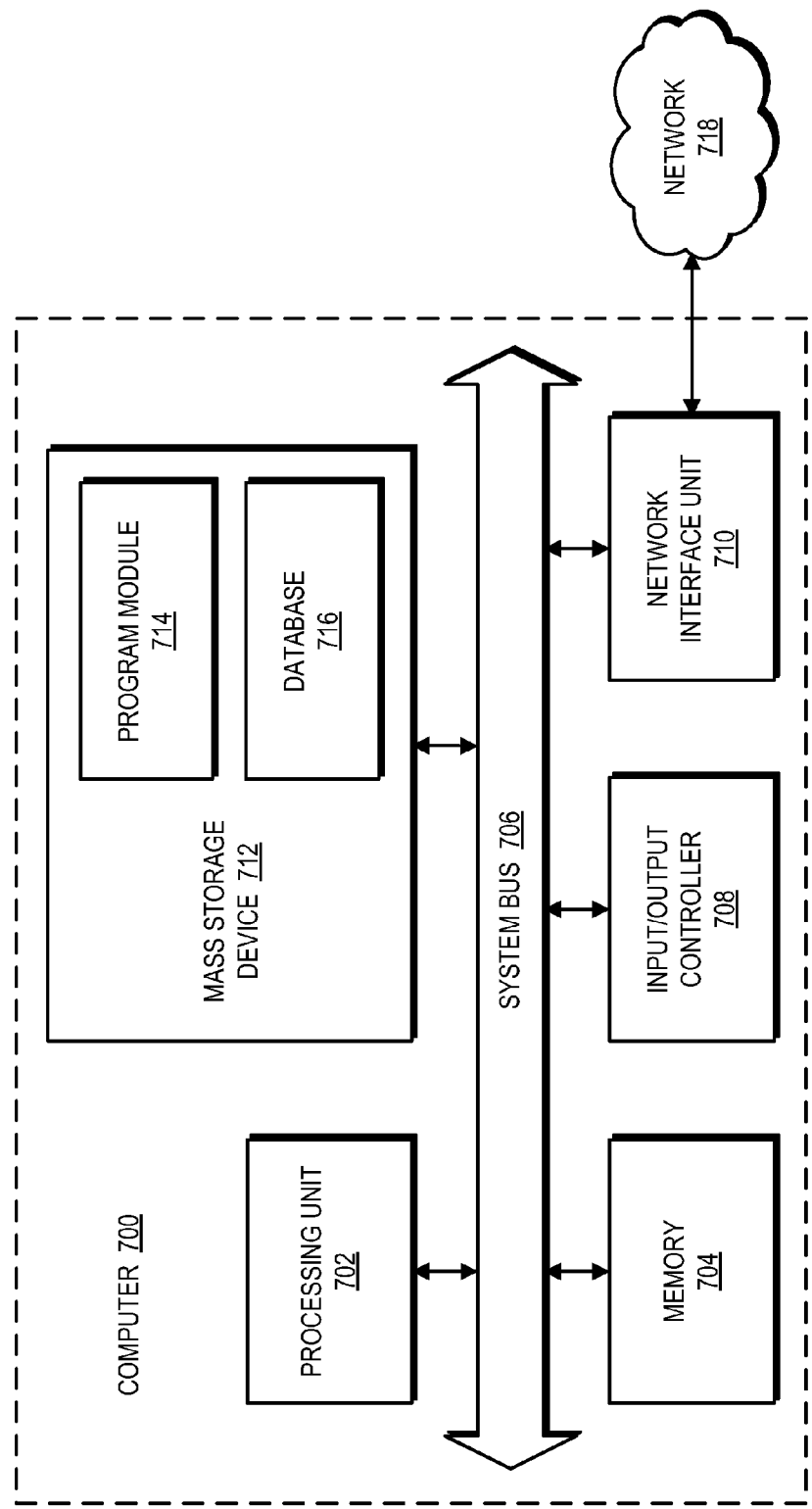
FIG. 7 is a computer architecture diagram showing aspects of an illustrative computer hardware architecture for a com-

Referring now to FIG. 7, an exemplary computer architecture diagram showing aspects of a computer 700 is illustrated. Examples of the computer 700 may include server computer 104 and the client computer 106. The computer 700 includes a processing unit 702 ("CPU"), a system memory 704, and a system bus 706 that couples the memory 704 to the CPU 702. The computer 700 further includes a mass storage device 712 for storing one or more program modules 714 and one or more databases 716. Examples of the program modules 714 may include the AXL applications 102, the application programs 116, and the AXL editors 112. The mass storage device 712 is connected to the CPU 702 through a mass storage controller (not shown) connected to the bus 706. The mass storage device 712 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available computer storage media that can be accessed by the computer 700.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 700.

According to various embodiments, the computer 700 may operate in a networked environment using logical connections to remote computers through a network 718. An example of the network 718 is the network 110. The computer 700 may connect to the network 718 through a network interface unit 710 connected to the bus 706. It should be appreciated that the network interface unit 710 may also be utilized to connect to other types of networks and remote computer systems. The computer 700 may also include an input/output controller 708 for receiving and processing input from a number of input devices (not shown), including a keyboard, a mouse, a microphone, and a game controller. Similarly, the input/output controller 708 may provide output to a display or other type of output device (not shown).

Based on the foregoing, it should be appreciated that technologies for generating platform-independent data applications such as AXL applications, are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

APPENDIX A

```
<Application Title="Contacts">
    <Settings>
        <Description>My Contacts Database</Description>
        <Keywords>
            <Keyword>Contacts</Keyword>
        </Keywords>
    </Settings>
    <DataModel>
        <Entity Name="Contacts" Attachments="True" SingleName="Contact">
            <Property Name="Company" Type="Text" Size="50"/>
            <Property Name="Last Name" Type="Text" Size="50"/>
            <Property Name="First Name" Type="Text" Size="50"/>
            <Property Name="E-Mail Address" Type="Text" Size="50"/>
            <Property Name="Job Title" Type="Text" Size="50"/>
            <Property Name="Business Phone" Type="Text" Size="25"/>
            <Property Name="Home Phone" Type="Text" Size="25"/>
            <Property Name="Mobile Phone" Type="Text" Size="25"/>
            <Property Name="Fax Number" Type="Text" Size="25"/>
            <Property Name="Address" Type="Memo"/>
            <Property Name="City" Type="Text" Size="50"/>
            <Property Name="State/Province" Type="Text" Size="50"/>
            <Property Name="ZIP/Postal Code" Type="Text" Size="15"/>
            <Property Name="Country/Region" Type="Text" Size="50"/>
            <Property Name="Web Page" Type="URL"/>
            <Property Name="Notes" Type="Memo"/>
        </Entity>
        <Query Name="Contacts Extended">
            <References>
                <Reference Source="Contacts"/>
            </References>
            <Results>
                <Property Alias="File As">
                    <Expression>
                        = If( isnull( [Last Name] ),
                            If( isnull( [First Name] ),
                                [Company],
                                [First Name] ),
                            If( isnull( [First Name] ),
                                [Last Name],
                                [Last Name] & ", " & [First Name] ) )
                    </Expression>
                </Property>
                <Property Alias="Contact Name">
                    <Expression>
                        = If( isnull( [Last Name] ),
                            If( isnull( [First Name] ),
```

APPENDIX A-continued

```
            [Company],
            [First Name] ),
                If( isnull( [First Name] ),
            [Last Name],
            [First Name] & "
" & [Last Name] ) )
        </Expression>
      </Property>
      <Property       All="True" Source="Contacts"/>
    </Results>
    <Ordering>
      <Order   Property="File   As" Direction="Ascending"/>
      <Order   Property="Contact   Name" Direction="Ascending"/>
    </Ordering>
  </Query>
 </DataModel>
 <UserInterface>
  <Views>
   <View Name="Contact Details">
    <Data>
     <QueryRef      Name="Contacts Extended"/>
    </Data>
    <Presentation>
     ... Form XML ...
    </Presentation>
    <Macros>
    </Macros>
   </View>
   <View Name="Contact List">
    <Data>
     <Query      Name="Contacts Extended"/>
    </Data>
    <Presentation>
     ... Form XML ...
    </Presentation>
    <Macros>
    </Macros>
   </View>
   <View Name="Contact Address Book">
    <Data>
     <Query      Name="Contacts Extended"/>
    </Data>
    <Presentation>
     ... Form XML ...
    </Presentation>
    <Macros>
    </Macros>
   </View>
   <View Name="Contact Phone List">
    <Data>
     <Query      Name="Contacts Extended"/>
    </Data>
    <Presentation>
    ... Form XML ...
    </Presentation>
    <Macros>
    </Macros>
   </View>
  </Views>
 </UserInterface>
 <Navigation>
 </Navigation>
</Application>
```

What is claimed is:

1. A computer-implemented method for generating a platform-independent data application, comprising:
   receiving, in a platform-independent format, a definition of application information for providing a description of the platform-independent data application, wherein the application information comprises meta-information about the platform-independent data application;
   receiving, in the platform-independent format, a definition of a data schema for defining data types;
   receiving, in the platform-independent format, a definition of a user interface for accessing data stored as instances of the data types;
   receiving, in the platform-independent format, a definition of business logic for enforcing validation rules and actions associated with the data types; and
   generating the platform-independent data application in a markup language file including the definition of the data schema, the definition of the user interface, and the definition of business logic, the markup language file implementing the platform-independent format and being executable within an application program from the definitions of the data schema, user interface, and business logic.

2. The computer-implemented method of claim 1, wherein the platform-independent data application is further generated using the definition of application information.

3. The computer-implemented method of claim 2, further comprising providing the platform-independent data application to an application program adapted to implement the platform-independent data application.

4. The computer-implemented method of claim 1, wherein receiving, in the platform-independent format, a definition of a data schema for defining data types comprises receiving, in the platform-independent format, a definition of a structure of the data types and a definition of relationships between the data types.

5. The computer-implemented method of claim 1, wherein receiving, in the platform-independent format, a definition of a user interface for accessing data stored in the data types comprising receiving, in the platform-independent format, a definition of a form for displaying and editing the data stored in the data types, the form adapted to be displayed on a display device.

6. The computer-implemented method of claim 5, wherein receiving, in the platform-independent format, a definition of a user interface for accessing data stored in the data types further comprises receiving, in the platform-independent format, a definition of a report for presenting the data stored in the data types, the report adapted to be printed through a printing device.

7. The computer-implemented method of claim 1, wherein receiving, in the platform-independent format, a definition of business logic for enforcing validation rules and actions associated with the data types comprises receiving, in the platform-independent format, a definition of business logic at the data level for enforcing validation rules and actions associated with the data and a definition of business logic at the user interface level for enforcing validation rules and actions associated with the user interface.

8. The computer-implemented method of claim 1, wherein one or more portions of the platform-independent data application are reusable in a second platform-independent data application.

9. The computer-implemented method of claim 1, wherein:
   the definition of the application information in the platform-independent format consists of a structured markup language;
   the definition of the data schema consists of the structured markup language; and
   the definition of the business logic consists of the structured markup language.

10. The computer-implemented method of claim 1, wherein the platform-independent format is a text format.

11. A computer-implemented method for generating a platform-independent data application, comprising:
   receiving, in a platform-independent format, a definition of application information for providing a description of the platform-independent data application, wherein the application information comprises meta-information about the platform-independent data application;
   receiving, in the platform-independent format, a definition of a data schema for defining data types and definition relationships between the data types;
   receiving, in the platform-independent format, a definition of a form for displaying and editing data stored in the data types through a display device and a definition of a report for presenting the data stored in the data types through a printing device;
   receiving, in the platform-independent format, a definition of business logic at a data level for enforcing validation rules and actions associated with the data types and a definition of business logic at a form level for enforcing validation rules and actions associated with the form; and
   generating the platform-independent data application in a markup language file including the definition of the application information, the definition of the data schema, the definition of the form, the definition of the report, the definition of business logic at the data level, and the definition of business logic at the form level, the markup language file implementing the platform-independent format and being executable within an application program from the definitions of the data schema, user interface, and business logic.

12. The computer-implemented method of claim 11, wherein the definition of the form and the definition of the report are defined based on one or more queries directed to the data.

13. The computer-implemented method of claim 11, wherein one portion of the platform-independent computer application is capable of being copied and inserted into a second platform-independent computer application, and wherein the second platform-independent computer application is capable of being implemented without access to other portions of the platform-independent computer application.

14. The computer-implemented method of claim 11, further comprising providing the platform-independent data application to a server computer adapted to implement the platform-independent data application through a web application over a computer network.

15. The computer-implemented method of claim 11, wherein the platform-independent computer application comprises a tracking application adapted to manage the data and relationships between the data as the data is added to, removed, and edited.

16. A computer-readable storage device medium having stored thereon a data structure defining a platform-independent data application for implementation through an application program executing on a computer, the data structure comprising:
   a first data type storing a platform-independent definition of a data schema for defining data types in a markup language;
   a second data type storing a platform-independent definition of a user interface for accessing data stored in the data types in the markup language;
   a third data type storing a platform-independent definition of business logic for enforcing validation rules and actions associated with the data types in the markup language; and
   a fourth data type storing a platform-independent definition of application information for providing a description of the platform-independent data application, wherein the application information comprises meta-information about the platform-independent data application in the markup language;
   wherein the platform-independent data application is stored in a markup language file defined in the markup language and has a platform-independent format that includes the first, second, third, and fourth data types, the markup language file being executable within an application program from the definitions of the data schema, user interface, and business logic in the markup language file.

17. The computer-readable storage device of claim 16, wherein the platform-independent definition of the data schema comprises a platform-independent definition of a structure of the data types and a platform-independent definition of relationships between the data types.

18. The computer-readable storage device of claim 16, wherein the platform-independent definition of a user interface comprises a platform-independent definition of a form for displaying and editing the data stored in the data types, the form adopted to be displayed on a display device, and a platform-independent definition of a report for displaying the data stored in the data types, the report adapted to be presented through a printing device.

19. The computer-readable storage device of claim 16, wherein the platform-independent definition of business logic comprises a platform-independent definition of business logic at the data level for enforcing validation rules and actions associated with the data and a platform-independent definition of business logic at the user interface level for enforcing validation rules and actions associated with the user interface.

20. The computer-readable storage device of claim 16, wherein the platform-independent computer application comprises a tracking application adapted to manage the data and relationships between the data as the data is added to, removed, and edited.

* * * * *